(12) United States Patent
Zhu et al.

(10) Patent No.: US 9,521,039 B2
(45) Date of Patent: Dec. 13, 2016

(54) METHOD AND SYSTEM FOR MANAGING DEVICES IN BATCHES

(71) Applicant: Huawei Device Co., Ltd., Shenzhen (CN)

(72) Inventors: Yu Zhu, Shenzhen (CN); Qinliang Zhang, Shenzhen (CN); Zhenwei Shan, Shenzhen (CN); Junjie Zhao, Shenzhen (CN); Xinmiao Chen, Shenzhen (CN)

(73) Assignee: Huawei Device Co., Ltd, Shenzhen (CN)

( * ) Notice: Subject to any disclaimer, the term of this patent is extended or adjusted under 35 U.S.C. 154(b) by 460 days.

(21) Appl. No.: 14/144,003

(22) Filed: Dec. 30, 2013

(65) Prior Publication Data

US 2014/0115131 A1 Apr. 24, 2014

Related U.S. Application Data

(63) Continuation of application No. PCT/CN2012/079877, filed on Aug. 9, 2012.

(30) Foreign Application Priority Data

Aug. 23, 2011 (CN) .......................... 2011 1 0243086

(51) Int. Cl.
G06F 15/177 (2006.01)
H04L 12/24 (2006.01)

(52) U.S. Cl.
CPC ....... *H04L 41/0813* (2013.01); *H04L 41/0893* (2013.01); *H04L 41/0206* (2013.01); *H04L 41/0213* (2013.01); *H04L 41/0233* (2013.01)

(58) Field of Classification Search
CPC ............. H04L 41/0813; H04L 41/0893; H04L 41/0206; H04L 41/0213; H04L 41/0233
(Continued)

(56) References Cited

U.S. PATENT DOCUMENTS

2004/0123091 A1 6/2004 Das
2006/0004742 A1* 1/2006 Datla .................. H04L 41/0866
(Continued)

FOREIGN PATENT DOCUMENTS

CN 1742268 A 3/2006
CN 1866855 A 11/2006
(Continued)

OTHER PUBLICATIONS

Foreign Communication from a Counterpart Application, Chinese Application No. 201110243086.7, Chinese Office Action dated Sep. 17, 2014, 17 pages.
(Continued)

*Primary Examiner* — Wing F Chan
*Assistant Examiner* — Joseph Maniwang
(74) *Attorney, Agent, or Firm* — Conley Rose, P.C.

(57) ABSTRACT

A method, a gateway, an auto-configuration server, and a system for managing devices in batches are provided. The method includes: creating a batch management group according to a batch management group creation rule and device information in a network; receiving a batch management command sent by an auto-configuration server for devices in the batch management group; determining a device that needs to be managed in the batch management group according to the batch management command; converting the batch management command into a command supported by the device that needs to be managed; and sending the command supported by the device that needs to be managed to the device that needs to be managed. The method implements batch management of devices in a network covered by a gateway.

22 Claims, 9 Drawing Sheets

(58) Field of Classification Search
USPC .......................................................... 709/221
See application file for complete search history.

(56) References Cited

U.S. PATENT DOCUMENTS

| | | | | |
|---|---|---|---|---|
| 2008/0137673 | A1* | 6/2008 | Phuah | .................... H04L 12/66 370/401 |
| 2008/0154957 | A1* | 6/2008 | Taylor | ................... G06F 9/4411 |
| 2008/0215668 | A1* | 9/2008 | Hu | ...................... H04L 41/0806 709/202 |
| 2009/0280794 | A1 | 11/2009 | Desruelle et al. | |

FOREIGN PATENT DOCUMENTS

| | | |
|---|---|---|
| CN | 1866958 A | 11/2006 |
| CN | 101421978 A | 4/2009 |
| CN | 101753989 A | 6/2010 |
| CN | 101783735 A | 7/2010 |
| CN | 101958878 A | 1/2011 |
| JP | 20070272736 A | 10/2007 |
| JP | 20090534882 A | 9/2009 |
| KR | 20050112806 A | 12/2005 |
| WO | 2007106196 A | 9/2007 |

OTHER PUBLICATIONS

Foreign Communication from a Counterpart Application, Chinese Application No. 201110243086.7, Chinese Search Report dated Sep. 9, 2014, 3 pages.

Foreign Communication From a Counterpart Application, PCT Application No. PCT/CN2012/079877, English Translation of International Search Report dated Nov. 15, 2012, 2 pages.

Foreign Communication From a Counterpart Application, PCT Application No. PCT/CN2012/079877, English Translation of Written Opinion dated Nov. 15, 2012, 15 pages.

Foreign Communication From a Counterpart Application, European Application No. 12825649.2, Extended European Search Report dated May 21, 2014, 12 pages.

"Gateway Management Object Technical Specification," Draft Version 1.0, Open Mobile Alliance, OMA-TS-GwMO-V1_0-20110729-D, XP064070481, Jul. 29, 2011, 50 pages.

"TR-069 Amendment 3, CPE WAN Management Protocol," Broadband Forum, Technical Report, Issue 1, Protocol Version 1.2., Nov. 2010, 197 pages.

"TR-069, CPE WAN Management Protocol," Broadband Forum, Technical Report, Issue 1, Amendment 4, Protocol Version 1.3, XP055097503, Jul. 2011, 190 pages.

Partial English Translation and Abstract of Chinese Patent Application No. CN001866958A, Jul. 12, 2014, 5 pages.

Partial English Translation and Abstract of Chinese Patent Application No. CN101753989A, Jul. 12, 2014, 4 pages.

Foreign Communication From a Counterpart Application, Japanese Application No. 2014-526369, Japanese Office Action dated Dec. 24, 2015, 4 pages.

Foreign Communication From a Counterpart Application, Japanese Application No. 2014-526369, English Translation of Japanese Office Action dated Dec. 24, 2015, 5 pages.

* cited by examiner

METHOD AND SYSTEM FOR MANAGING DEVICES IN BATCHES

CROSS-REFERENCE TO RELATED APPLICATIONS

This application is a continuation of International Application No. PCT/CN2012/079877, filed on Aug. 9, 2012, which claims priority to Chinese Patent Application No. 201110243086.7, filed on Aug. 23, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method and a system for managing devices in batches.

BACKGROUND

The Broadband Forum (BBF) defines the TR-069 protocol, and an auto-configuration server is capable of remotely managing a gateway in a home network or an office network by using the TR-069 protocol. For non-TR-069 devices (devices that do not support the TR-069 protocol in a network), an auto-configuration server cannot directly perform remote management on these non-TR-069 devices by using the TR-069 protocol. Instead, the auto-configuration server performs remote management by using a gateway as a proxy. When an auto-configuration server needs to manage a non-TR-069 device, the auto-configuration server delivers a command to a gateway by using the TR-069 protocol, and then the gateway is in charge of converting the command of the TR-069 protocol into a command of a protocol that is supported by non-TR-069 devices.

At present, the non-TR-069 device management solution does not support a batch management function. Therefore, it is necessary to add the batch management function so as to enable batch management of a great number of devices in a network. In addition, in a home network, generally, there are various different types of devices or devices that have different protocols. For example, medium/communications devices, household appliances, sensors, and other devices of different types generally have different communications protocols. Therefore, not only batch management of non-TR-069 devices that support the same protocol needs to be considered, but also batch management of non-TR-069 devices that support different protocols needs to be considered.

SUMMARY

In view of the preceding problem, embodiments of the present invention provide a method, a gateway, an auto-configuration server, and a system for managing devices in batches, which implement batch management of devices in a network covered by a gateway.

An embodiment of the present invention provides a method for managing devices in batches, including: creating a batch management group according to a batch management group creation rule and device information in a network; receiving a batch management command sent by an auto-configuration server for devices in the batch management group; determining, according to the batch management command, a device that needs to be managed in the batch management group; converting the batch management command into a command supported by the device that needs to be managed; and sending the command supported by the device that needs to be managed to the device that needs to be managed.

An embodiment of the present invention provides a gateway, including: a batch management group creating unit, a receiving unit, a determining unit, a converting unit, and a sending unit, where the batch management group creating unit is configured to create a batch management group according to a batch management group creation rule and device information in a network, where the batch management group creation rule is made and sent to a gateway by an auto-configuration server; the receiving unit is configured to receive the batch management group creation rule sent by the auto-configuration server, receive a batch management command sent by the auto-configuration server for the batch management group, and receive device information sent by a managed device; the determining unit is configured to determine, according to the batch management command, a device that needs to be managed in the batch management group; the converting unit is configured to convert the batch management command into a command supported by the device that needs to be managed; and the sending unit is configured to send the command supported by the device that needs to be managed to the device that needs to be managed.

An embodiment of the present invention provides an auto-configuration server, including: a batch management group creation rule making unit, a batch management command generating unit, and a sending unit, where the batch management group creation rule making unit is configured to make a batch management group creation rule, where the rule is used to instruct a gateway to create a batch management group for devices in a network; the batch management command generating unit is configured to generate a batch management command for the batch management group according to a demand of managing devices of the batch management group in the network in batches; and the sending unit is configured to send the batch management group creation rule to the gateway and send the batch management command for the batch management group to the gateway.

An embodiment of the present invention provides a system for managing devices in batches, including: a gateway, an auto-configuration server, and a device, where, the gateway includes a batch management group creating unit, a receiving unit, a determining unit, a converting unit, and a sending unit, where the batch management group creating unit is configured to create a batch management group according to a batch management group creation rule and device information in a network, where the batch management group creation rule is made and sent to a gateway by an auto-configuration server; the receiving unit is configured to receive the batch management group creation rule sent by the auto-configuration server, receive a batch management command sent by the auto-configuration server for the batch management group, and receive device information sent by a managed device; the determining unit is configured to determine, according to the batch management command, a device that needs to be managed in the batch management group; the converting unit is configured to convert the batch management command into a command supported by the device that needs to be managed; and the sending unit is configured to send the command supported by the device that needs to be managed to the device that needs to be managed; and the auto-configuration server includes a batch management group creation rule making unit, a batch management command generating unit, and a sending unit, where the batch management group creation rule making unit is configured to make a batch management group creation rule, where the rule is used to instruct a gateway to create a batch management group for devices in a network; the batch management command generating unit is configured to generate a batch management command for the batch management group according to a demand of managing devices of the batch management group in the network in batches; and the sending unit is configured to send the batch management group creation rule to the gateway and send the batch management command for the batch management group to the gateway.

An embodiment of the present invention provides a method for managing devices in batches, including: obtaining information about commands supported by each device in N (N is a natural number that is greater than or equal to 2) devices; generating a common command according to the information about commands supported by each device and generating a data model corresponding to the common command, where the N devices support at least two types of communications protocols; receiving a batch management command sent by an auto-configuration server for the data model corresponding to the common command; converting the batch management command into commands supported by one or more devices in the N devices; and sending the commands supported by the one or more devices to the one or more devices in the N devices.

An embodiment of the present invention provides a gateway, including: a receiving unit, a common command generating unit, a data model generating unit, and a sending unit, where the receiving unit is configured to receive information about commands supported by each device in N (N is a natural number that is greater than or equal to 2) devices in a network, and receive a batch management command sent by an auto-configuration server; the common command generating unit is configured to generate a common command according to the information about commands supported by each device in the N devices; the data model generating unit is configured to generate a data model corresponding to the common command; and the sending unit is configured to send commands supported by one or more devices to the one or more devices in the N devices.

An embodiment of the present invention provides an auto-configuration server, including: a batch management command generating unit and a sending unit, where the batch management command generating unit is configured to generate a batch management command for a data model corresponding to a common command; and the sending unit is configured to send the batch management command for a data model corresponding to a common command to a gateway.

An embodiment of the present invention provides a system for managing devices in batches, including: a gateway, an auto-configuration server, and a device, where the gateway includes a receiving unit, a common command generating unit, a data model generating unit, and a sending unit, where the receiving unit is configured to receive information about commands supported by each device in N (N is a natural number that is greater than or equal to 2) devices in a network, and receive a batch management command sent by an auto-configuration server; the common command generating unit is configured to generate a common command according to the information about commands supported by each device in the N devices; the data model generating unit is configured to generate a data model corresponding to the common command; and the sending unit is configured to send commands supported by one or more devices to the one or more devices in the N devices; and the auto-configuration server includes a batch management command generating unit and a sending unit, where the batch management command generating unit is configured to generate a batch management command for a data model corresponding to a common command; and the sending unit is configured to send the batch management command for a data model corresponding to a common command to a gateway.

An embodiment of the present invention provides a method for managing devices in batches, including: obtaining information about commands supported by each device in N (N is a natural number that is greater than or equal to 2) devices and sending the information to an auto-configuration server, where the N devices support at least two types of communications protocols; generating a data model corresponding to a common command according to an instruction of the auto-configuration server, where the common command is generated by the auto-configuration server according to the information about commands supported by each device in the N devices; receiving a batch management command sent by the auto-configuration server for the data model corresponding to the common command; converting the batch management command into commands supported by one or more devices in the N devices; and sending the commands supported by the one or more devices to the one or more devices in the N devices.

An embodiment of the present invention provides a gateway, including: a receiving unit, a sending unit, and a data model generating unit, where the receiving unit is configured to receive information about commands supported by each device in N (N is a natural number that is greater than or equal to 2) devices in a network, receive an instruction of generating a data model corresponding to a common command, where the instruction is sent by an auto-configuration server, and receive a batch management command sent by the auto-configuration server; the sending unit is configured to send the information about commands supported by each device in the N devices in the network to the auto-configuration server, and send commands supported by one or more devices to the one or more devices in the N devices; and the data model generating unit is configured to, according to the received instruction of generating a data model corresponding to a common command that is sent by the auto-configuration server, generate the data model corresponding to the common command.

An embodiment of the present invention provides an auto-configuration server, including a receiving unit, a common command generating unit, and a sending unit, where the receiving unit is configured to receive information about commands supported by each device in N (N is a natural number that is greater than or equal to 2) devices in a network sent by a gateway; the common command generating unit is configured to generate a common command according to the information about commands supported by each device in the N devices; and the sending unit is configured to send an instruction of generating a data model corresponding to the common command to the gateway, and send a batch management command for the data model corresponding to the common command to the gateway.

An embodiment of the present invention provides a system for managing devices in batches, including: a gateway, an auto-configuration server, and a device, where, the gateway includes a receiving unit, a sending unit, and a data model generating unit, where the receiving unit is configured to receive information about commands supported by each device in N (N is a natural number that is greater than or equal to 2) devices in a network, receive an instruction of generating a data model corresponding to a common command, where the instruction is sent by an auto-configuration server, and receive a batch management command sent by the auto-configuration server; the sending unit is configured to send the information about commands supported by each device in the N devices in the network to the auto-configuration server, and send commands supported by one or more devices to the one or more devices in the N devices; and the data model generating unit is configured to: according to the received instruction of generating a data model corresponding to a common command that is sent by the auto-configuration server, generate the data model corresponding to the common command; and the auto-configuration server includes a receiving unit, a common command generating unit, and a sending unit, where the receiving unit is configured to receive information about commands supported by each device in N (N is a natural number that is greater than or equal to 2) devices in a network sent by a gateway; the common command generating unit is configured to generate a common command according to the information about commands supported by each device in the N devices; and the sending unit is configured to send an instruction of generating a data model corresponding to the common command to the gateway, and send a batch management command for the data model corresponding to the common command to the gateway.

BRIEF DESCRIPTION OF THE DRAWINGS

To illustrate the technical solutions in the embodiments of the present invention more clearly, the following briefly describes the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
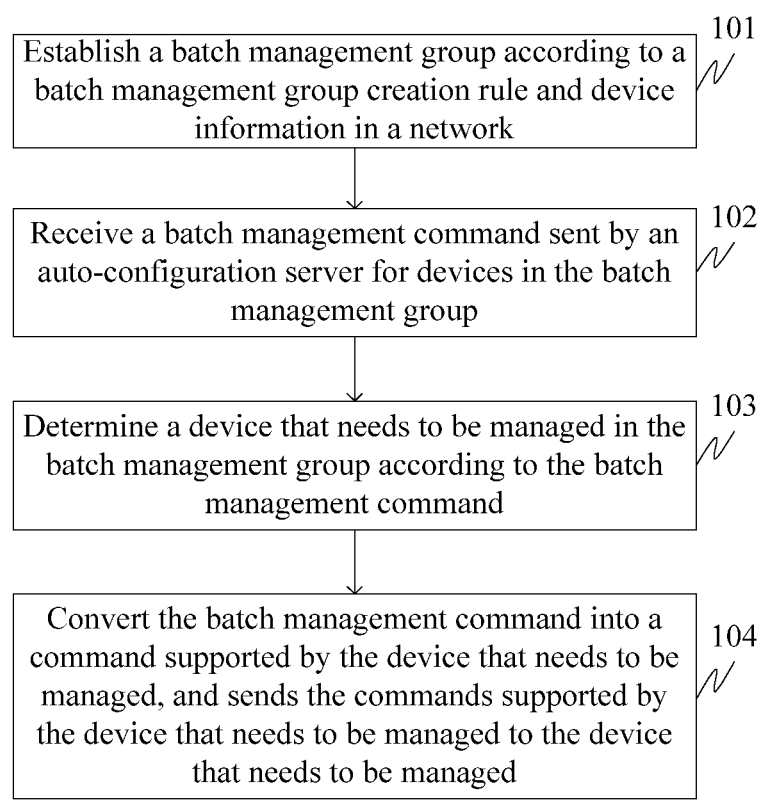
FIG. 1 is a schematic diagram of a method for managing devices in batches according to an embodiment of the present invention.

As shown in FIG. 1, the embodiment of the present invention provides a method for managing devices in batches, where a gateway creates a batch management group according to a batch management group creation rule and device information in a network, and manages devices in the network in batches according to a batch management command sent by an auto-configuration server for devices in the batch management group. The method specifically includes the following steps:

Step 101: Create a batch management group according to a batch management group creation rule and device information in a network.

At first, the gateway receives the batch management group creation rule delivered by the auto-configuration server, where the batch management group creation rule delivered by the auto-configuration server to the gateway is used to instruct the gateway of which rule is used for creating a batch management group. The batch management group creation rule includes one or a combination of a plurality of the following conditions: a protocol, a protocol version number, a device vendor, and a device type. For example, the batch management group creation rule is "protocol and Vendor", which indicates that the batch management group is created according to the protocol types of devices and device vendors, so devices that support the same protocol and belong to the same device vendor are categorized into one batch management group. The auto-configuration server is an Auto-Configuration Server (ACS) defined in the BBF TR-069 protocol, or a server that is capable of managing or configuring a gateway and a device.

The gateway receives an online message sent by a device in a network and obtains device information. When a device in a network comes online, the device sends an online message to the gateway. The online message contains device information, where the device information includes: a protocol, a protocol version number, a device vendor, and a device type.

The gateway determines whether the device should belong to a created batch management group according to the creation rule and the device information. For example, the batch management group creation rule is "protocol and Vendor", there are two created batch management groups in the gateway, identification information of batch management group 1 is "protocol=UPnP DM, Vendor=B", and identification information of batch management group 2 is "protocol=ZigBee, Vendor=A". If information of device X is protocol=Universal Plug and Play (UPnP) Device Management (DM), Vendor=B, device X should belong to batch management group 1; if information of device Y is protocol=ZigBee, Vendor=C, device Y should not belong to batch management group 1 and also should not belong to batch management group 2.

When it is determined that the device should not belong to any of the created batch management groups according to the creation rule and the device information, a batch management group is created and the device is added into the newly created batch management group; and for the preceding example, the gateway creates a new batch management group for device Y and adds device Y into the batch management group, where the identification information of the batch management group is "protocol=ZigBee, Vendor=C", and group members include device Y; or when it is determined that the device belongs to a created batch management groups according to the creation rule and the device information, the device is added into the created batch management group; and for the preceding example, the gateway adds device X into batch management group 1.

Optionally, the creating a batch management group according to a batch management group creation rule and device information in a network may also be: receiving the batch management group creation rule delivered by the auto-configuration server, and creating one or more batch management groups according to the creation rule; receiving the online message sent by the device in the network and obtaining the device information; and adding the device into the created batch management group according to the creation rule and the device information.

At this time, the gateway creates a batch management group in a real-time manner according to the batch management group creation rule delivered by the auto-configuration server, and adds the device that meets the batch management group creation rule into the batch management group.

Further, the creating a batch management group specifically includes: generating parameter information of the batch management group in a data model, where the parameter information includes member information of the batch management group, and/or identification information of the batch management group, and/or commands supported by members in the batch management group. The following table shows an exemplary implementation manner of parameters of the batch management group in the data model.

| Parameter Name | Description |
| --- | --- |
| InternetGatewayDevice.Proxier | Object of a proxied device |
| InternetGatewayDevice.Proxier.groupRule | Batch management group creation rule |
| InternetGatewayDevice.Proxier.BatchManageGroup.{i} | Object of a batch management group |
| Member | Member of a batch management group |
| Groupinfo | Identification information of a batch management group |
| InternetGatewayDevice.Proxier.BatchManageGroup.{i}.Actionlist.{i} | Command supported by a member in a batch management group |
| ActionName | Command name |
| Invokerule | Command invoke rule for specifying which members of a batch management group shall execute management operations |
| Inputpara | Input parameter |
| Outputpara | Output parameter |
| status | Batch management execution status |

In the embodiment of the present invention, InternetGatewayDevice.Proxier refers to an object of a proxied device and is used to describe a managed device.

InternetGatewayDevice.Proxier.groupRule refers to a batch management group creation rule for the managed device and is used to instruct a gateway how to create a batch management group for a dynamically found device. For example, when the value of this parameter is "protocol and version", a batch management group is created according to device protocols and protocol versions, so devices that support the same protocol that is of the same version shall be categorized into one group.

InternetGatewayDevice.Proxier.BatchManageGroup. {i} refers to an object of a batch management group. Creating a new batch management group means creating a new instance of a batch management group. For example, if a batch management group for all devices whose supported protocol type is UPnP and protocol version is 1.0 is created, the instance number of the group is 1, and the expressing method is InternetGatewayDevice.Proxier.BatchManageGroup.{1}; if a batch management group for all devices whose supported protocol type is ZigBee and protocol version is 0x02, the instance number of the group is 2, and the expressing method is InternetGatewayDevice.Proxier.BatchManageGroup.{2}.

Member refers to a member of a batch management group. For example, InternetGatewayDevice.Proxier.BatchManageGroup.{1}.Member refers to a device that is contained in batch management group, and the parameter value of Member is identification information of the device that is contained in batch management group 1, such as device identifier (ID).

Groupinfo refers to identification information of a batch management group and is used to indicate the batch management group creation rule. For example, if InternetGatewayDevice.Proxier.BatchManageGroup.{1}.Groupinfo is protocol:UPnP, version:1.0, devices contained in batch management group 1 are devices that support the protocol type UPnP and the protocol version 1.0.

InternetGatewayDevice.Proxier.BatchManageGroup.{i}.Actionlist. {j} refers to a command object of a batch management group. For example, InternetGatewayDevice.Proxier.BatchManageGroup.{1}.Actionlist. {3} indicates that the instance number of the command object of batch management group 1 is 3.

A command object contains parameters that describe commands supported by devices in a batch management group. For example, the parameters include a command name, a command invoke rule, an input parameter, an output parameter, and command execution status.

ActionName refers to a command name in a command object, for example, a restart command is named Reboot.

Invokerule refers to a command invoke rule and is used to specify which members in the batch management group shall execute the batch management command.

Inputpara refers to an input parameter and is used to identify a parameter carried in a command to be executed for a device. For example, if a device restart command is going to be executed in ten minutes, a delay parameter delay whose value is 10 minutes (min) is contained in the Inputpara parameter.

Outputpara refers to an output parameter and is used to indicate an aggregation of command responses sent by devices in the group.

Status refers to a batch management execution status and is used to indicate an execution result of the batch management command. For example, after all devices that need to be managed by using the batch management command respond to the command or after the time for responding to the command expires, an aggregated command execution result is reported through an event, and the value of the Status parameter is set to finished, indicating that the batch management operation is finished.

An auto-configuration server first uses a SetParameterValues( ) command to set the InternetGatewayDevice.Proxier.groupRule parameter in a data model of a gateway for instructing the gateway of how to create a batch management group for dynamically found devices. For example, when the value of this parameter is "protocol and version", a batch management group is created according to device protocol types and protocol versions, so devices that support the same protocol that is of the same version shall be categorized into one group.

After finding a new device, the gateway determines whether the device matches conditions of an existing group according to the batch management group creation rule. If yes, add the device into the existing group; if not, create a new group instance, set the command supported by the device into ActionList of the new group instance, set group information, and add the device into the newly created group as a group member.

For example, when InternetGatewayDevice.Proxier.groupRule="protocol and version", the gateway finds a device, where the protocol supported by the device is UPnP, and the protocol version number is 1.0. Through searching for the InternetGatewayDevice.Proxier.BatchManageGroup.{i}. Groupinfo parameter in the data model, the gateway determines whether a batch management group instance whose supported protocol type is UPnP and protocol version number is 1.0 has been created. If yes, set the InternetGatewayDevice.Proxier.BatchManageGroup.{i}.Member parameter to add the device into the created group instance; if not, create a batch management group, that is, specifically create a batch management group instance, set parameter information of the instance, including settingInternetGatewayDevice.Proxier.BatchManageGroup.{i}. Member (setting the identifier of the device into the parameter value) and InternetGatewayDevice.Proxier.BatchManageGroup.{i}. Groupinfo (setting information that the protocol is UPnP and the protocol version number is 1.0 into the parameter value), and create an InternetGatewayDevice.Proxier.BatchManageGroup.{i}.Actionlist.{i} instance to set the command supported by the device into the instance.

Step 102: Receive the batch management command sent by the auto-configuration server for devices in the batch management group.

The ACS sends a SetParameterValues( ) command to the gateway, sets parameters of the batch management group, and starts a batch management operation. Parameters to be set include the following: InternetGatewayDevice.Proxier.BatchManageGroup. {i}.Actionlist. {i}. Invokerule (indicating members in the group for which the batch management operation is executed), InternetGatewayDevice.Proxier.BatchManageGroup. {i}.Actionlist. {i}. Inputpara (setting an input parameter of Action to be invoked), and InternetGatewayDevice.Proxier.BatchManageGroup.{i}.Actionlist. {i}. status (setting the parameter to execute, indicating that Action that is identified by the InternetGatewayDevice.Proxier.BatchManageGroup. {i}.Actionlist. {i}.ActionName parameter is to be executed).

The gateway sends a SetParameterValues( ) response message to the ACS, indicating that the batch management command has been received.

Step 103: Determine a device that needs to be managed in the batch management group according to the batch management command.

The gateway determines which devices the command needs to be sent to according to the value of the InternetGatewayDevice.Proxier.BatchManageGroup.{i}.Actionlist.{i}. Invokerule parameter. Invokerule refers to a command invoke rule and is used to specify which members in the batch management group shall execute the batch management command. For example, the group contains devices of vendor A and vendor B. If only devices of vendor A are to be managed, set the value of Invokerule to "vendor=A".

Step 104: Convert the batch management command into a command supported by the device that needs to be managed, and send the command supported by the device that needs to be managed to the device that needs to be managed.

The gateway determines what command is sent to the devices according to InternetGatewayDevice.Proxier.BatchManageGroup. {i}.Actionlist. {i}.ActionName.

For example, if ActionName is Reboot in the UPnP DM protocol, the purpose of the batch management operation is to restart the devices in batches. The gateway generates a Reboot( ) command of the UPnP DM protocol (namely, action in UPnP).

The command supported by the device that needs to be managed is sent to the device that needs to be managed as determined in step 103. For example, the Reboot( ) command generated in step 104 is sent to the devices of vendor A in the group through the UPnP protocol.

Further, the gateway receives a command response sent by the device that needs to be managed, generates an execution result of the batch management command to be sent to the auto-configuration server according to the command response, and sends the execution result to the auto-configuration server.

After finishing executing the command, the device that needs to be managed sends a command response to the gateway, where the command response contains the command execution result.

For example, a device sends a Reboot( ) response message to the gateway, and the value of the Reboot Status parameter in the response message is RebootNow, which indicates that the device has accepted the restart command and will execute a restarting operation immediately.

After receiving the command response, the gateway generates an execution result of the batch management command to be sent to the auto-configuration server and writes the command execution result into the Internet GatewayDevice.Proxier.BatchManageGroup.{i}.Actionlist. {i}. Outputpara parameter. For example, device A1 successfully executes the command, and device A2 fails to execute the command. The value of the Outputpara parameter is: DeviceName=A1, RebootStatus=RebootNow; and DeviceName=A2, ErrorCode=400.

After all the devices that need to be managed by using the batch management command respond to the command, or after the time for responding to the command expires, an aggregated command execution result is reported through a "4 VALUE CHANGE" event of TR-069, and the value of the InternetGatewayDevice.Proxier.BatchManageGroup. {i}.Actionlist.{i}. status parameter is set to finished, indicating that the batch management operation is finished.

In the embodiment of the present invention, a gateway creates a batch management group according to a batch management group creation rule and device information in a network and manages devices in the network in batches according to a batch management command sent by an auto-configuration server for devices in the batch management group, thereby implementing batch management of the devices in the network covered by the gateway.

Embodiment 2

Figure 2:
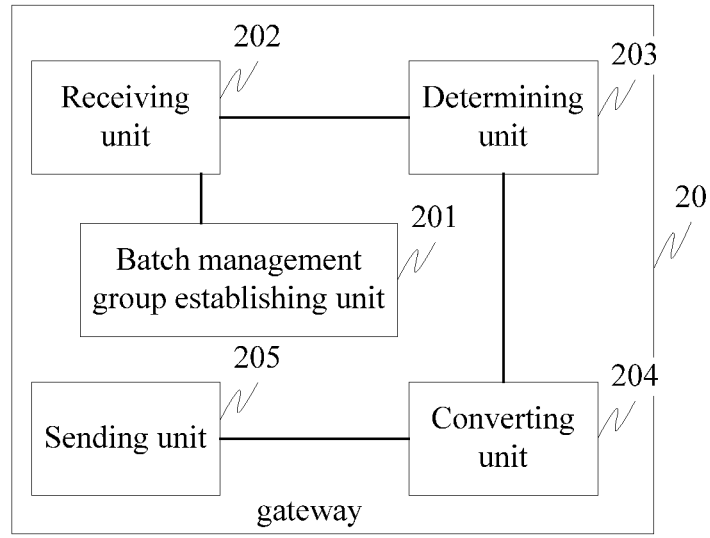
FIG. 2 is a schematic structural diagram of a gateway according to an embodiment of the present invention.

FIG. 2 is a schematic structural diagram of a gateway according to the embodiment of the present invention. The gateway creates a batch management group according to a batch management group creation rule and device information in a network, and manages devices in the network in batches according to a batch management command sent by an auto-configuration server for devices in the batch management group. A gateway 20 includes: a batch management group creating unit 201, a receiving unit 202, a determining unit 203, a converting unit 204, and a sending unit 205.

The batch management group creating unit 201 is configured to create a batch management group according to a batch management group creation rule and device information in a network, where the batch management group creation rule is made and sent to a gateway by an auto-configuration server; the device information in a network refers to information of devices under the gateway in the network, including a protocol, a protocol version number, a device vendor, and a device type. Optionally, the batch management group creating unit 201 categorizes devices that support protocols of the same type and the same version number into one management group.

The receiving unit 202 is configured to receive the batch management group creation rule sent by the auto-configuration server, receive a batch management command sent by the auto-configuration server for the batch management group, and receive the device information sent by a managed device.

The determining unit 203 is configured to determine a device that needs to be managed in the batch management group according to the batch management command, where a command invoke rule includes a protocol, a protocol version number, a device vendor, and a device type.

The converting unit 204 is configured to convert the batch management command into a command supported by the device that needs to be managed. Protocol types and protocol version numbers supported by devices of different batch management groups are different, so devices in some batch management groups may fail to directly execute the batch management command, and therefore, the batch management command needs to be converted into the command supported by the device that needs to be managed.

The sending unit 205 is configured to send the batch management command to the device that needs to be managed.

In the embodiment of the present invention, a gateway creates a batch management group according to a batch management group creation rule and device information in a network and manages devices in the network in batches according to a batch management command received from an auto-configuration server, thereby implementing batch management of the devices in the network covered by the gateway.

Embodiment 3

Figure 3:
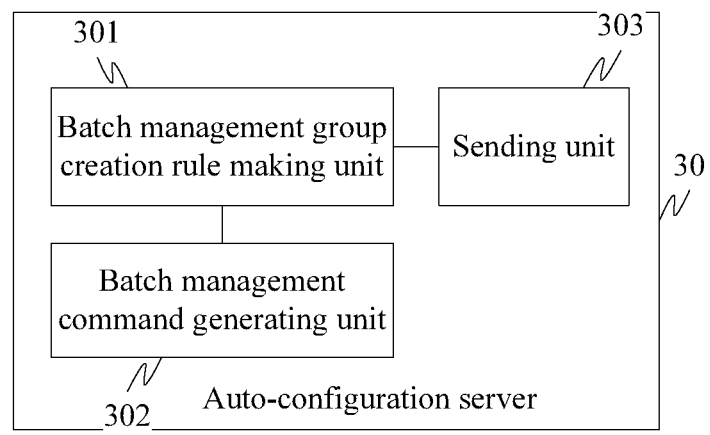
FIG. 3 is a schematic structural diagram of an auto-configuration server according to an embodiment of the present invention.

FIG. 3 is a schematic structural diagram of an auto-configuration server according to the embodiment of the present invention. The auto-configuration server makes a batch management group creation rule and sends a batch management command for devices in the batch management group to a gateway, for performing batch management on devices in the network. An auto-configuration server 30 includes: a batch management group creation rule making unit 301, a batch management command generating unit 302, a sending unit 303, and a receiving unit.

The batch management group creation rule making unit 301 is configured to make a batch management group creation rule, where the rule is used to instruct a gateway to create a batch management group for devices in a network. Optionally, the rule is categorizing devices that support protocols of the same type and the same version number into one management group.

The batch management command generating unit 302 is configured to generate a batch management command for the batch management group according to a demand of managing devices of the batch management group in the network in batches so as to manage the batch management group.

The sending unit 303 is configured to send the batch management group creation rule to the gateway and send the batch management command for the batch management group to the gateway.

In the embodiment of the present invention, an auto-configuration server makes a batch management group creation rule and sends a batch management command for devices in a batch management group to a gateway for managing the devices in a network in batches, thereby implementing batch management of the devices in the network covered by the gateway.

Embodiment 4

Figure 4:
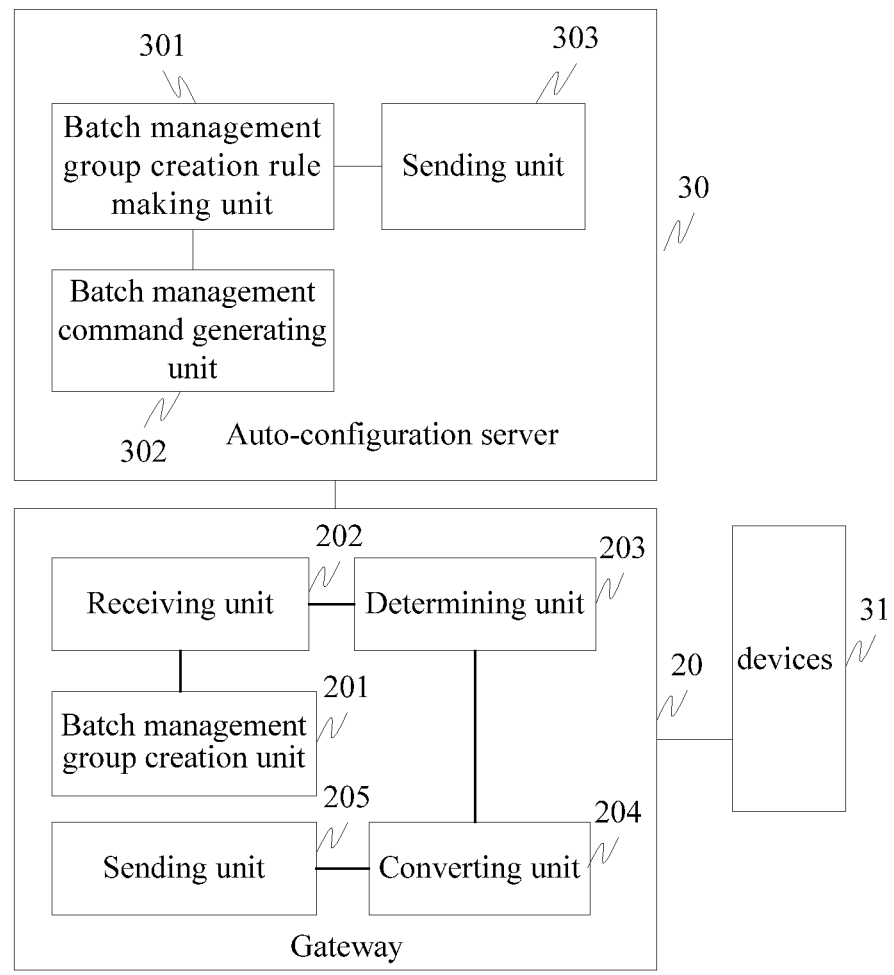
FIG. 4 is a schematic structural diagram of a system for managing devices in batches according to an embodiment of the present invention.

FIG. 4 is a schematic structural diagram of a system for managing devices in batches according to the embodiment of the present invention. In the embodiment of the present invention, a gateway creates a batch management group according to a batch management group creation rule and device information in a network, and manages devices in the network in batches according to a batch management command sent by an auto-configuration server for devices in the batch management group. The system includes a gateway 20, an auto-configuration server 30, and devices 31.

The gateway 20 includes: a batch management group creating unit 201, a receiving unit 202, a determining unit 203, a converting unit 204, and a sending unit 205.

The batch management group creating unit 201 is configured to create a batch management group according to a batch management group creation rule and device information in a network, where the batch management group creation rule is made and sent to a gateway by an auto-configuration server; the device information in a network refers to information of devices under the gateway in the network, including a protocol, a protocol version number, a device vendor, and a device type. Optionally, the batch management group creating unit 201 categorizes devices that support protocols of the same type and the same version number into one management group.

The receiving unit 202 is configured to receive the batch management group creation rule sent by the auto-configuration server, receive a batch management command sent by the auto-configuration server for the batch management group, and receive the device information sent by a managed device.

The determining unit 203 is configured to determine according to the batch management command a device that needs to be managed in the batch management group, where the batch management command includes a command invoke rule; and the command invoke rule includes a protocol, a protocol version number, a device vendor, and a device type.

The converting unit 204 is configured to convert the batch management command into a command supported by the device that needs to be managed. Protocol types and protocol version numbers supported by devices of different batch management groups are different, so devices in some batch management groups may fail to directly execute the batch management command, and therefore, the batch management command needs to be converted into the command supported by the device that needs to be managed.

The sending unit 205 is configured to send the batch management command to the device that needs to be managed.

The auto-configuration server 30 includes: a batch management group creation rule making unit 301, a batch management command generating unit 302, and a sending unit 303.

The batch management group creation rule making unit 301 is configured to make a batch management group creation rule, where the rule is used to instruct a gateway to create a batch management group for devices in a network. Optionally, the rule is categorizing devices that support protocols of the same type and the same version number into one management group.

The batch management command generating unit 302 is configured to generate a batch management command for the batch management group according to a demand of managing devices of the batch management group in the network in batches so as to manage the batch management group.

The sending unit 303 is configured to send the batch management group creation rule to the gateway and send the batch management command for the batch management group to the gateway.

In the embodiment of the present invention, a gateway creates a batch management group according to a batch management group creation rule and device information in a network and manages devices in the network in batches according to a batch management command sent by an auto-configuration server for devices in the batch management group, thereby implementing batch management of the devices in the network covered by the gateway.

Embodiment 5

Figure 5:
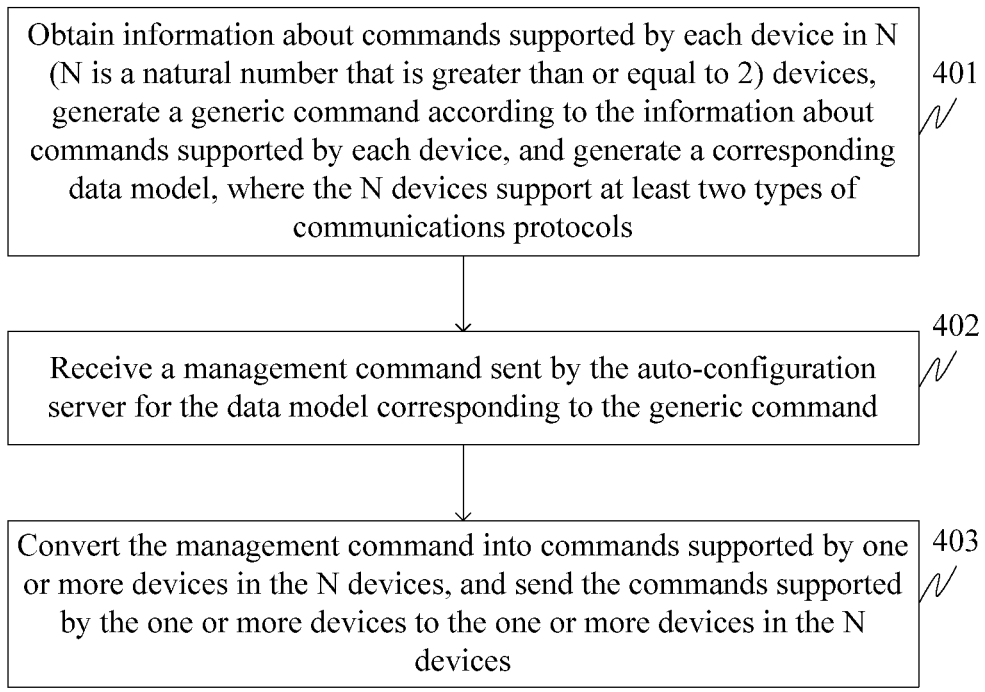
FIG. 5 is a schematic diagram of a method for managing devices in batches according to an embodiment of the present invention.

As shown in FIG. 5, the embodiment of the present invention provides a method for managing devices in batches. In the embodiment of the present invention, a gateway is relatively intelligent, has a capability of understanding a communications protocol, and is capable of generating a common command according to information about commands supported by each device in a network. In the embodiment of the present invention, the gateway obtains the information about the commands supported by each device in the network, generates a generic command according to the information of the commands supported by each device in the network, receives a batch management command for a data model corresponding to the generic command sent by an auto-configuration server, and manages the devices in the network in batches. The method specifically includes the following steps:

Step 401: Obtain information about commands supported by each device in N (N is a natural number that is greater than or equal to 2) devices, generate a common command according to the information about commands supported by each device, and generate a data model corresponding to the common command, where the N devices support at least two types of communications protocols.

A gateway first obtains basic information and capability information of each device in N (N is a natural number that is greater than or equal to 2) devices through the UpnP, ZigBee, and other protocols, where the basic information includes a device ID, a device type, a protocol version, and a device vendor. Protocols supported by each device in the N devices are not the same protocol, that is, the N devices support at least two communications protocols. The communications protocols include UPnP, ZigBee, Cordless Advanced Technology—internet and quality (Cat-iq), Z-Wave, or Intelligent Grouping and Resource Sharing (IGRS).

For example, basic information of the devices obtained through the UPnP protocol is: universally unique identifier (uuid), UPnP_Light, 1.0, Vendor_A; basic information of the devices obtained through the ZigBee protocol is: Node Identifier (NodeID), ZigBee_Camera, 1.0, Vendor_B. Capability information of the devices obtained through the UPnP protocol is: UPnP: UPnP_DM_BMS::Reboot( ), UPnP_DM_SMS::Update( ); capability information of the devices obtained through the ZigBee protocol is: ZigBee: switch_set on, switch_set off, camera_upgrade.

Based on the information above, the information of the commands supported by the devices may be known; because of the understanding of the gateway on the UPnP, ZigBee, and other communications protocols, a common command may be obtained by classifying and abstracting the capabilities according to a preset strategy. If one command or a combination of a plurality of commands supported by each device is capable of implementing a certain general function, generate a common command that is capable of supporting the general function, where the common command corresponds to one command or a combination of a plurality of commands supported by each device.

Take a restarting function as an example. Suppose that the Reboot( ) command is in the UPnP protocol, the Reboot( ) command is in the ZigBee command, or there is no Reboot( ) command in the ZigBee protocol, but the restarting function may be implemented through a combination of a PowerOff operation and a PowerON operation. Then a common command may be generated for the restarting function, and the command name is Reboot( ) Similarly, a common command may be generated for other general functions, such as upgrading and restoring factory settings.

Further, the gateway generates a data model corresponding to the common command, where the data model includes a common command, a common command invoke rule, a common command execution response result, and other attributes. The following table specifically shows an exemplary implementation manner of a data model corresponding to a common command in the embodiment.

| Device ID | Device Type | Device Vendor | Supported Protocol | Protocol Version Number |
|---|---|---|---|---|
| ID1 | STB | A | UPnP DM | 1.0 |
| ID2 | DECT phone | B | Cat-iq | 1.1 |
| ID3 | Lamp | C | ZigBee | 1.0 |
| ID4 | Lamp | D | Z-Wave | 1.0 |
| ID5 | Camera | E | ZigBee | 1.0 |

The auto-configuration server is an ACS defined in the BBF TR-069 protocol, or a server that is capable of managing or configuring a gateway and a device.

Step 402: Receive a batch management command sent by the auto-configuration server for the data model corresponding to the common command.

The gateway receives the batch management command sent by the auto-configuration server for the data model corresponding to the common command. For example, if the batch management command is a restart command, the auto-configuration server sends a SetParameterValues com-

| Name | Data Type | Indicated Value | Description |
|---|---|---|---|
| InternetGatewayDevice.Proxier.DevicesCommand. | SingleInstance | | Object of a common command, used by an auto-configuration server to send a batch management command to a group of devices that are of different types or support different protocols |
| InternetGatewayDevice.Proxier.DevicesCommand.Reboot | SingleInstance | | Object of a single instance, describing a common command corresponding to a restarting function |
| Execute | Boolean | 0 | Boolean type, default value: 0, triggering a restarting operation when set to 1 |
| Filter | String | 0 | Command invoke rule, used to determine devices that need to be restarted |
| Result | String | 1 | Response result of a restarting batch management command executed by managed devices |
| InternetGatewayDevice.Proxier.DevicesCommand.Upgrade. | SingleInstance | | Object of a single instance, describing a common command corresponding to an upgrading function |
| Execute | Boolean | 0 | Boolean type, default value: 0, triggering an upgrading operation when set to 1 |
| Filter | String | 0 | Command invoke rule, used to determine devices that need to be upgraded |
| Result | String | 1 | Response result of an upgrading batch management command executed by managed devices |
| InternetGatewayDevice.Proxier.DevicesCommand.Reset. | SingleInstance | | Object of a single instance, describing a common command corresponding to a resetting function |
| Execute | Boolean | 0 | Boolean type, default value: 0, triggering a resetting operation when set to 1 |
| Filter | String | 0 | Command invoke rule, used to determine devices that need to be reset |
| Result | String | 1 | Response result of a resetting batch management command executed by managed devices |

The gateway reports information about the newly added data model to the ACS through an Inform message to instruct the ACS to manage devices in batches through the newly added data model. Further, the Inform message may also contain a device information list, where the list contains information about a general function supported by the devices and other information and the information is used by the auto-configuration server to determine which operations are supported by the devices and to set the command invoke rule Filter when sending the batch management command. For example, the device information list to be sent is:

mand to the gateway, and sets the data model corresponding to the common command Reboot. In this embodiment, a parameter in the common command InternetGatewayDevice.Proxier.DevicesCommand.Reboot is set to InternetGatewayDevice.Proxier.DevicesCommand.Reboot.Excute=1.

The batch management command also contains a filter condition for determining a device that needs to be managed in the N devices. In this embodiment, the command invoke rule Filter parameter may be described specifically by using an Extensible Markup Language (XML) structure, for example:

```
<Filter>
    <IDs>all</IDs>
    <vendor>all</vendor>
    <protocols>UPnP,ZigBee</protocols>
    <version>all</version>
</Filter>
```

Step 403: Convert the batch management command into commands supported by one or more devices in the N devices, and send the commands supported by the one or more devices to the one or more devices in the N devices.

The gateway first determines a device that needs to be managed in the N devices according to the filter condition in the batch management command, that is, the gateway determines to manage one or more devices in the N devices based on the filter condition.

In the embodiment of the present invention, according to Filter in step 402, it may be determined that a restart Reboot command is sent to all devices that support the UPnP and ZigBee protocols in the network without considering whether device vendors and protocol version numbers of the devices are the same.

Then the batch management command is converted into commands supported by one or more devices in the N devices, that is, the common command is converted into commands supported by the devices according to the rule of generating a common command in the foregoing described step 401 and then the commands supported by the one or more devices are sent to the one or more devices in the N devices.

Further, if the commands supported by the one or more devices are formed by a plurality of operations, it is needed to convert the batch management command into the plurality of operations corresponding to the commands supported by the one or more devices in the N devices, and send the plurality of operations corresponding to the commands supported by the one or more devices to the one or more devices in the N devices.

For example, if a device supports a Reboot command, send the Reboot command to the device; if the device uses a combination of a PowerOff operation and a PowerON operation to implement the restarting function, send the PowerOff operation and the PowerON operation to the device for implementing the restarting function.

Further, the gateway receives a command response sent by the device that needs to be managed, generates, according to the command response, an execution result of the batch management command to be sent to the auto-configuration server, and sends the execution result to the auto-configuration server.

For example, a device sends a Reboot( ) response message to the gateway, and the value of the RebootStatus parameter in the response message is RebootNow, which indicates that the device has accepted the restart command and will execute a restarting operation immediately. The gateway, according to the command execution response, sends to the auto-configuration server, and sets the value of Result of the batch management command to Success, or Failed, or Exception, or each device ID and execution situation; then the gateway sends the parameter name and the parameter value of Result to the auto-configuration server through a "4 VALUE CHANGE" event of the TR-069 protocol.

In the embodiment of the present invention, a gateway obtains information about commands supported by each device in a network, generates a common command according to the information about commands supported by each device in the network, receives a batch management command sent by an auto-configuration server for a data model corresponding to the common command, and manages devices in the network in batches, thereby implementing batch management of the devices in the network covered by the gateway.

Embodiment 6

Figure 6:
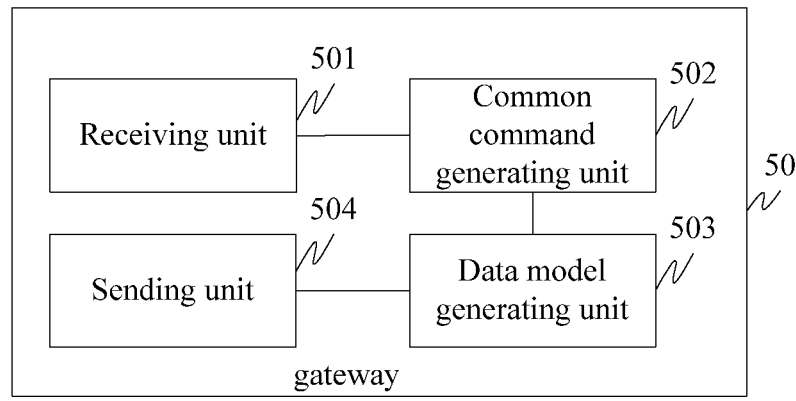
FIG. 6 is a schematic structural diagram of a gateway according to an embodiment of the present invention.

FIG. 6 is a schematic structural diagram of a gateway according to the embodiment of the present invention. The gateway generates a common command according to information about commands supported by each device in N (N is a natural number that is greater than or equal to 2) devices in a network, and manages devices in the network in batches according to a batch management command received from an auto-configuration server. A gateway 50 includes: a receiving unit 501, a common command generating unit 502, a data model generating unit 503, and a sending unit 504, where the receiving unit 501 is configured to receive information about commands supported by each device in N (N is a natural number that is greater than or equal to 2) devices in a network, and receive a batch management command sent by an auto-configuration server; the common command generating unit 502 is configured to generate a common command according to the information about commands supported by each device in the N devices; the data model generating unit 503 is configured to generate a data model corresponding to the common command; and the sending unit 504 is configured to send commands supported by one or more devices to the one or more devices in the N devices.

In the embodiment of the present invention, a gateway obtains capacity information of each device in a network, generates a common command according to information about commands supported by each device in the network, receives a batch management command sent by an auto-configuration server for a data model corresponding to the common command, and manages the devices in the network in batches, thereby implementing batch management of the devices in the network covered by the gateway.

Embodiment 7

Figure 7:
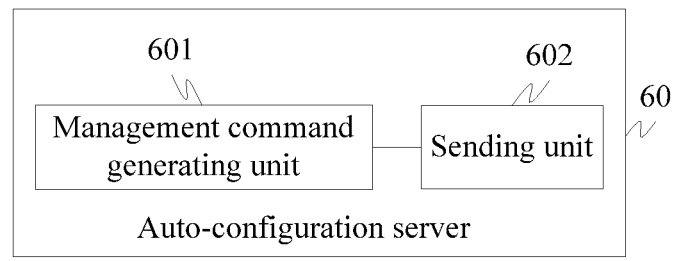
FIG. 7 is a schematic structural diagram of an auto-configuration server according to an embodiment of the present invention.

FIG. 7 is a schematic structural diagram of an auto-configuration server according to the embodiment of the present invention. The auto-configuration server sends a batch management command to a gateway to manage devices in batches in the network covered by the gateway. An auto-configuration server 60 includes: a batch management command generating unit 601 and a sending unit 602, where the batch management command generating unit 601 is configured to generate a batch management command for a data model corresponding to a common command; and the sending unit 602 is configured to send the batch management command for the data model corresponding to the common command to the gateway.

In the embodiment of the present invention, an auto-configuration server sends a batch management command to a gateway and manages devices under the gateway in the network in batches, thereby implementing batch management of the devices in the network covered by the gateway.

Embodiment 8

Figure 8:
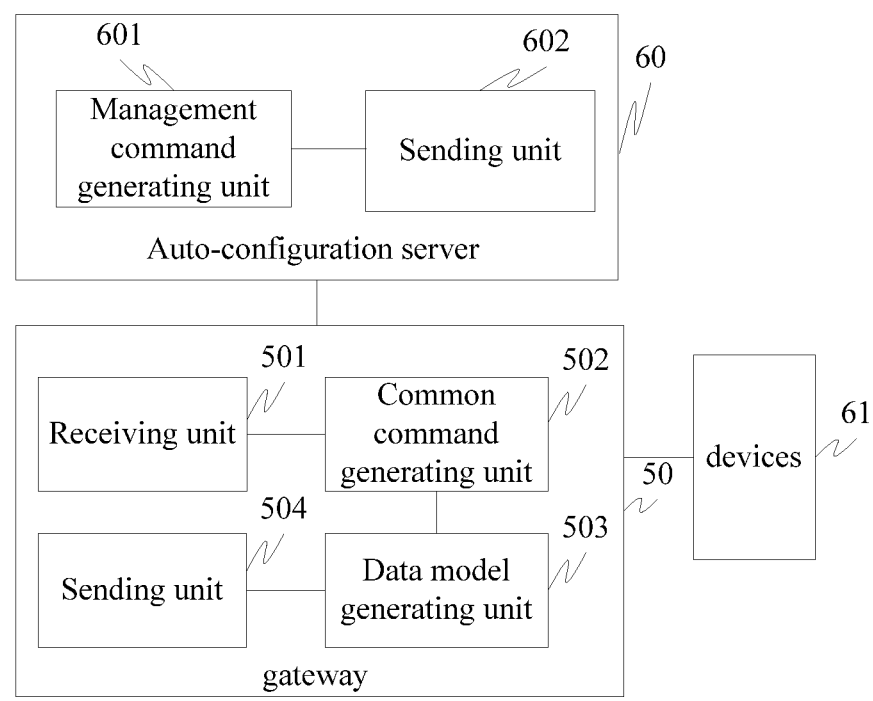
FIG. 8 is a schematic structural diagram of a system for managing devices in batches according to an embodiment of the present invention.

FIG. 8 is a schematic structural diagram of a system for managing devices in batches in the embodiment of the present invention, and the system includes a gateway 50, an auto-configuration server 60, and devices 61.

The gateway 50 includes: a receiving unit 501, a common command generating unit 502, a data model generating unit 503, and a sending unit 504, where the receiving unit 501 is configured to receive information about commands supported by each device in N (N is a natural number that is greater than or equal to 2) devices in a network, and receive a batch management command sent by an auto-configuration server; the common command generating unit 502 is configured to generate a common command according to the information about commands supported by each device in the N devices; the data model generating unit 503 is configured to generate a data model corresponding to the common command; and the sending unit 504 is configured to send commands supported by one or more devices to the one or more devices in the N devices.

The auto-configuration server 60 includes: a batch management command generating unit 601 and a sending unit 602, where the batch management command generating unit 601 is configured to generate a batch management command for the data model corresponding to the common command; and the sending unit 602 is configured to send the batch management command for the data model corresponding to the common command to a gateway.

In the embodiment of the present invention, a gateway obtains capacity information of each device in a network, generates a common command according to information about commands supported by each device in the network, receives a batch management command sent by an auto-configuration server for a data model corresponding to the common command, and manages the devices in the network in batches, thereby implementing batch management of the devices in the network covered by the gateway.

Embodiment 9

Figure 9:
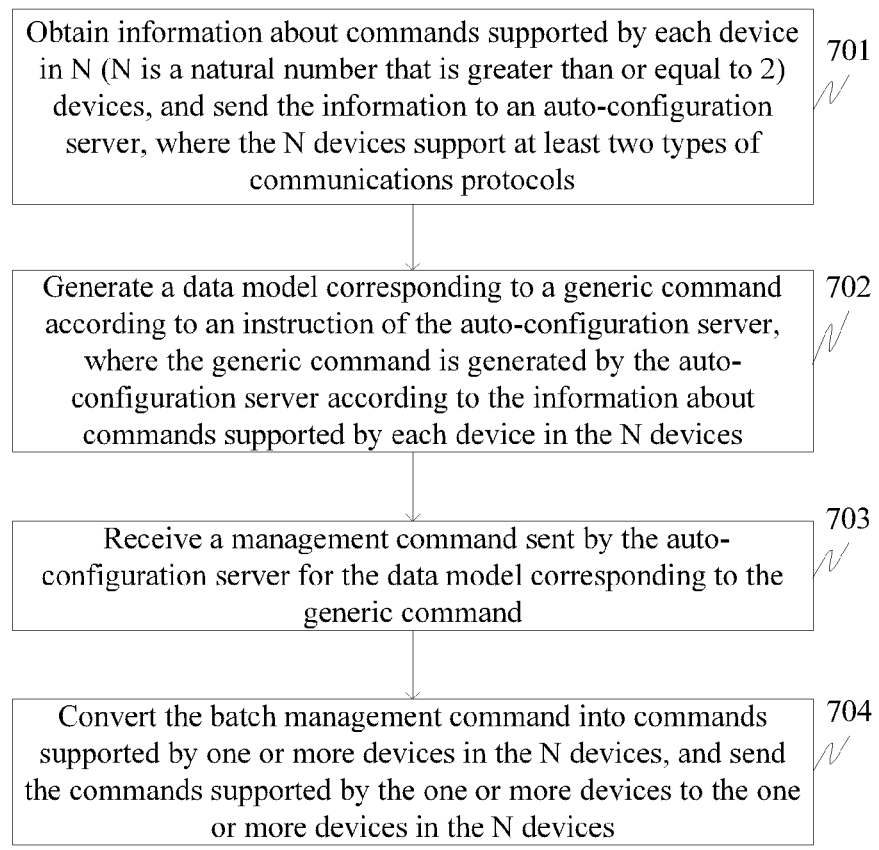
FIG. 9 is a schematic diagram of a method for managing devices in batches according to an embodiment of the present invention.

As shown in FIG. 9, the embodiment of the present invention provides a method for managing devices in batches. In the embodiment of the present invention, an auto-configuration server is relatively intelligent, has a capability of understanding a communications protocol, and is capable of generating a common command according to information about commands supported by each device in a network. In the embodiment of the present invention, a gateway obtains the information about commands supported by each device in the network, and sends the information about commands supported by each device to the auto-configuration server; the auto-configuration server generates a common command according to the information about commands supported by each device in the network; and the gateway generates a data model corresponding to the common command according to an instruction of the auto-configuration server, receives a batch management command sent by the auto-configuration server for the data model corresponding to the common command, and manages the devices in the network in batches. The method specifically includes the following steps:

Step 701: Obtain information about commands supported by each device in N (N is a natural number that is greater than or equal to 2) devices, and send the information to an auto-configuration server, where the N devices support at least two types of communications protocols.

A gateway first obtains basic information and capability information of each device in N (N is a natural number that is greater than or equal to 2) devices through the UPnP, ZigBee, and other protocols, where the basic information includes a device ID, a device type, a protocol version, and a device vendor.

Protocols supported by each device in the N devices are not the same protocol, that is, the N devices support at least two communications protocols. The communications protocols include UPnP, ZigBee, Cat-iq, Z-Wave, or IGRS.

For example, basic information of the devices obtained through the UPnP protocol is: uuid, UPnP_Light, 1.0, Vendor_A; basic information of the devices obtained through the ZigBee protocol is: NodeID, ZigBee_Camera, 1.0, Vendor_B. Capability information of the devices obtained through the UPnP protocol is: UPnP: UPnP_DM_BMS:: Reboot( ), UPnP_DM_SMS::Update( ); capability information of the devices obtained through the ZigBee protocol is: ZigBee: switch_set on, switch_set off, camera_upgrade.

The gateway generates an XML document that is described by using the TR-069 protocol and contains capability information of each device, and directly records a batch management command supported by the devices into the XML document in an XML format. For example:

```
<DeviceList>
    <Device>
        <ID>1</ID>
        <frindlyName></frindlyName>
        <Type>STB</Type>
        <Vendor>A</Vendor>
        <Protocol>UPnP_DM_1.0</Protocol>
        <SupportedCommands>Reboot, BaselineReset,
            Ping</SupportedCommands>
    </Device>
    <Device>
        <ID>2</ID>
        <frindlyName></frindlyName>
        <Type>Security Camera</Type>
        <Vendor>B</Vendor>
        <Protocol>ZigBee_HomeAutomation_1.0</Protocol>
      <SupportedCommands>zha_PowerOn, zha_PowerOff,
            zha_Update</SupportedCommands>
    </Device>
</DeviceList>
```

The XML document contains capability information of two devices. Device 1 is a set-top box (STB) device of device vendor A, the device supports a PnP_DM protocol whose version number is 1.0U, and batch management commands that the device may support are Reboot, BaselineReset, and Ping. Device 2 is a Security Camera device of device vendor B, the device supports a ZigBee_HomeAutomation protocol whose version number is 1.0, and batch management commands that the device may support are zha_PowerOn, zha_PowerOff, and zha_Update.

The gateway sends the XML document to the auto-configuration server through an Inform message or an Upload method.

Further, the gateway may also have a device information list contained in the Inform message. The list contains information about a general function supported by the devices and other information. The information is used by the auto-configuration server to determine which operations are supported by the devices and to set the command invoke rule Filter when sending the batch management command.

For example, the device information list to be sent is:

| Device ID | Device Type | Device Vendor | Supported Protocol | Protocol Version Number |
|---|---|---|---|---|
| ID1 | STB | A | UPnP DM | 1.0 |
| ID2 | DECT phone | B | Cat-iq | 1.1 |

-continued

| Device ID | Device Type | Device Vendor | Supported Protocol | Protocol Version Number |
|---|---|---|---|---|
| ID3 | Lamp | C | ZigBee | 1.0 |
| ID4 | Lamp | D | Z-Wave | 1.0 |
| ID5 | Camera | E | ZigBee | 1.0 |

The auto-configuration server is an ACS defined in the BBF TR-069 protocol, or a server that is capable of managing or configuring a gateway and a device.

Step 702: Generate a data model corresponding to a common command according to an instruction of the auto-configuration server, where the common command is generated by the auto-configuration server according to the information about commands supported by each device in the N devices.

Based on the information contained in the received XML document, the auto-configuration server may know the information about the commands supported by the devices; and because of the understanding of the gateway on the UPnP, ZigBee, and other communications protocols, a common command may be obtained by classifying and abstracting the capabilities according to a preset strategy. If one command or a combination of a plurality of commands supported by each device is capable of implementing a certain general function, generate a common command that is capable of supporting the general function, where the common command corresponds to one command or a combination of a plurality of commands supported by each device.

Take a restarting function as an example. Suppose that the Reboot( ) command is in the UPnP protocol, the Reboot( ) command is in the ZigBee command, or there is no Reboot( ) command in the ZigBee protocol, but the restarting function may be implemented through a combination of a PowerOff operation and a PowerON operation. Then a common command may be generated for the restarting function, and the command name is Reboot( ). Similarly, a common command may be generated for other general functions, such as upgrading and restoring factory settings.

The auto-configuration server sends an AddObject instruction to the gateway to instruct the gateway to generate a data model corresponding to the common command. For example, the data model is as follows:

The gateway receives the batch management command sent by the auto-configuration server for the data model corresponding to the common command. For example, if the batch management command is a restart command, the auto-configuration server sends a SetParameterValues command to the gateway, and sets the data model corresponding to the common command Reboot. In this embodiment, parameters in the data model corresponding to the common command Reboot are set to InternetGatewayDevice.Proxier.DevicesCommand.Name=Upgrade, Commands= UPnP_SMS_Update,ZigBee_HA_Update,Z-Wave_CommandUpdate, Execute=1.

The batch management command also contains a filter condition for determining a device that needs to be managed in the N devices. In this embodiment, the command invoke rule Filter parameter may be described specifically by using an XML structure, for example:

```
<Filter>
<IDs>all</IDs>
<vendor>all</vendor>
<protocols>UPnP,ZigBee</protocols>
<version>all</version>
</Filter>
```

Step 704: Convert the batch management command into commands supported by one or more devices in the N devices, and send the commands supported by the one or more devices to the one or more devices in the N devices.

The gateway first determines a device that needs to be managed in the N devices according to the filter condition in the batch management command, that is, the gateway determines to manage one or more devices in the N devices based on the filter condition.

In the embodiment of the present invention, according to Filter in step 402, it may be determined that a restart Reboot command is sent to all devices that support the UPnP and ZigBee protocols in the network without considering whether device vendors and protocol version numbers of the devices are the same.

Then the batch management command is converted into commands supported by one or more devices in the N devices, that is, the common command is converted into commands supported by the devices according to the rule of generating a common command in the foregoing described

| Name | Data Type | Indicated Value | Description |
|---|---|---|---|
| InternetGatewayDevice.Proxier.DevicesCommand.{i} | Multi-Instance | | Object of a common command, used by an auto-configuration server to send a batch management command to a group of devices that are of different types or support different protocols |
| Name | String | 0 | Name of a common command |
| Commands | String | 0 | Names of commands that are corresponding to a common command and are supported by managed devices |
| Execute | Boolean | 0 | Boolean type, default value: 0, triggering a management operation when set to 1 |
| Filter | String | 0 | Command invoke command, used to determine a device that needs to be managed |
| Result | String | 1 | Response result of an upgrading batch management command executed by managed devices |

Step 703: Receive a batch management command sent by the auto-configuration server for the data model corresponding to the common command.

step 701, and then the commands supported by the one or more devices are sent to the one or more devices in the N devices.

Further, if the commands supported by the one or more devices are formed by a plurality of operations, it is needed to convert the batch management command into the plurality of operations corresponding to the commands supported by the one or more devices in the N devices, and send the plurality of operations corresponding to the commands supported by the one or more devices to the one or more devices in the N devices.

For example, if a device supports a Reboot command, directly send the Reboot command to the device; if the device uses a combination of a PowerOff operation and a PowerON operation to implement the restarting function, send the PowerOff operation and the PowerON operation to the device for implementing the restarting function.

Further, the gateway receives a command execution response sent by the device that needs to be managed, generates, according to the command execution response, an execution result of the batch management command to be sent to the auto-configuration server, and sends the execution result to the auto-configuration server.

For example, a device sends a Reboot( ) response message to the gateway, and the value of the RebootStatus parameter in the response message is RebootNow, which indicates that the device has accepted the restart command and will execute a restarting operation immediately. The gateway, according to the command execution response, sends to the auto-configuration server, and sets the value of Result of the batch management command to Success, or Failed, or Exception, or each device ID and execution situation; then the gateway sends the parameter name and the parameter value of Result to the auto-configuration server through a "4 VALUE CHANGE" event of the TR-069 protocol.

In the embodiment of the present invention, a gateway obtains information about commands supported by each device in a network, and sends the information about commands supported by each device to an auto-configuration server; the auto-configuration server generates a common command according to the information about commands supported by each device; and the gateway generates a data model corresponding to the common command according to an instruction of the auto-configuration server, receives a batch management command sent by the auto-configuration server for the data model corresponding to the common command, and manages the devices in the network in batches, thereby implementing batch management of the devices in the network covered by the gateway.

Embodiment 10

Figure 10:
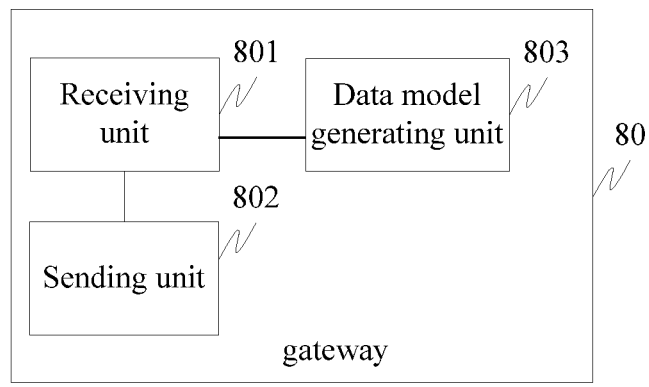
FIG. 10 is a schematic structural diagram of a gateway according to an embodiment of the present invention.

FIG. 10 is a schematic structural diagram of a gateway according to the embodiment of the present invention. The gateway obtains information about commands supported by each device in a network, and sends the information about commands supported by each device to an auto-configuration server; the auto-configuration server generates a common command according to the information about commands supported by each device; and the gateway generates a data model corresponding to the common command according to an instruction of the auto-configuration server, receives a batch management command sent by the auto-configuration server for the data model corresponding to the common command, and manages the devices in the network in batches. A gateway 80 includes: a receiving unit 801, a sending unit 802, and a data model generating unit 803.

The receiving unit 801 is configured to receive information about commands supported by each device in N (N is a natural number that is greater than or equal to 2) devices in a network, receive an instruction of generating a data model corresponding to a common command, where the instruction is sent by an auto-configuration server, and receive a batch management command sent by the auto-configuration server.

The sending unit 802 is configured to send the information about commands supported by each device in the N devices in the network to the auto-configuration server, and send commands supported by one or more devices to the one or more devices in the N devices.

The data model generating unit 803 is configured to: according to the instruction of generating a data model corresponding to the common command that is received from the auto-configuration server, generate a data model corresponding to the common command.

In the embodiment of the present invention, a gateway obtains information about commands supported by each device in a network, and sends the information about commands supported by each device to an auto-configuration server; the auto-configuration server generates a common command according to the information about commands supported by each device; and the gateway generates a data model corresponding to the common command according to an instruction of the auto-configuration server, receives a batch management command sent by the auto-configuration server for the data model corresponding to the common command, and manages the devices in the network in batches, thereby implementing batch management of the devices in the network covered by the gateway.

Embodiment 11

Figure 11:
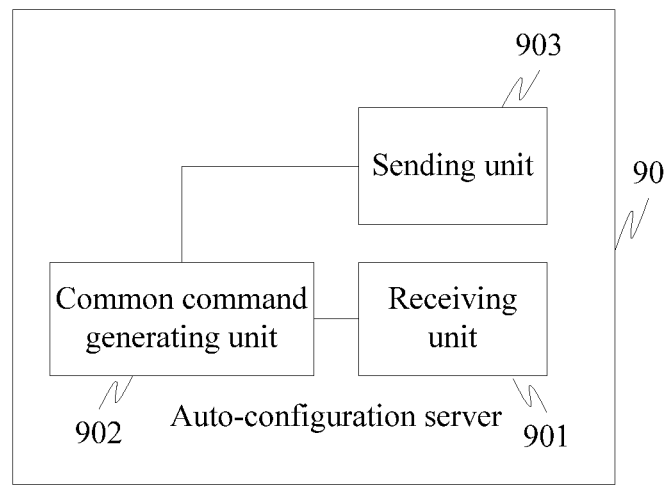
FIG. 11 is a schematic structural diagram of an auto-configuration server according to an embodiment of the present invention.

FIG. 11 is a schematic structural diagram of an auto-configuration server according to the embodiment of the present invention. The auto-configuration server receives information about commands supported by each device in a network sent by a gateway, generates a common command according to the information about commands supported by each device in the network, instructs the gateway to generate a data model corresponding to the common command, sends a batch management command for the data model corresponding to the common command to the gateway, and manages the devices in the network in batches. The auto-configuration server 90 includes: a receiving unit 901, a common command generating unit 902, and a sending unit 903.

The receiving unit 901 is configured to receive information about commands supported by each device in N (N is a natural number that is greater than or equal to 2) devices in a network sent by a gateway.

The common command generating unit 902 is configured to generate a common command according to the information about commands supported by each device in the N devices in the network.

The sending unit 903 is configured to send an instruction of generating a data model corresponding to the common command to the gateway, and send a batch management command for the data model corresponding to the common command to the gateway.

In the embodiment of the present invention, an auto-configuration server receives information about commands supported by each device in a network sent by a gateway, generates a common command according to the information about commands supported by each device in the network, instructs the gateway to generate a data model corresponding to the common command, sends a batch management command for the data model corresponding to the common command to the gateway, and manages the devices in the network in batches, thereby implementing batch management of the devices in the network covered by the gateway.

Embodiment 12

Figure 12:
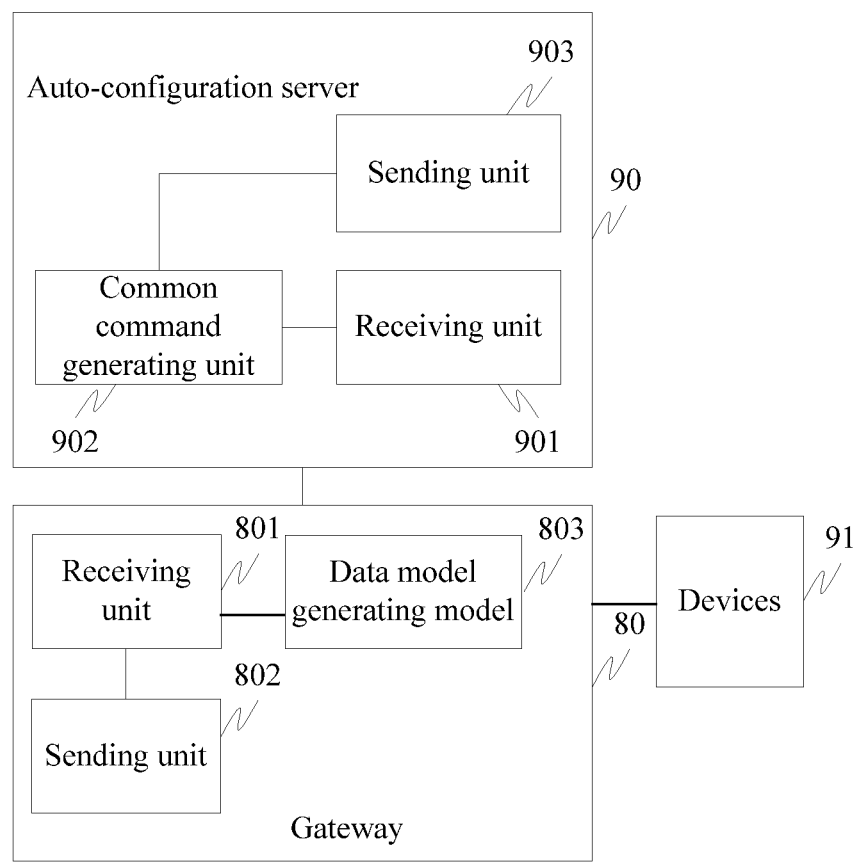
FIG. 12 is a schematic structural diagram of a system for managing devices in batches according to an embodiment of the present invention.

FIG. 12 is a schematic structural diagram of a system for managing devices in batches according to the embodiment of the present invention. A gateway obtains information about commands supported by each device in a network, and sends the information about commands supported by each device to an auto-configuration server; the auto-configuration server generates a common command according to the information about commands supported by each device; and the gateway generates a data model corresponding to the common command according to an instruction of the auto-configuration server, receives a batch management command sent by the auto-configuration server for the data model corresponding to the common command, and manages the devices in the network in batches. The system includes a gateway 80, an auto-configuration server 90, and devices 91.

The gateway 80 includes: a receiving unit 801, a sending unit 802, and a data model generating unit 803, where the receiving unit 801 is configured to receive information about commands supported by each device in N (N is a natural number that is greater than or equal to 2) devices in a network, receive an instruction of generating a data model corresponding to a common command, where the instruction is sent by an auto-configuration server, and receive a batch management command sent by the auto-configuration server; the sending unit 802 is configured to send the information about commands supported by each device in the N devices in the network to the auto-configuration server, and send commands supported by one or more devices to the one or more devices in the N devices; and the data model generating unit 803 is configured to: according to the instruction of generating a data model corresponding to the common command that is received from the auto-configuration server, generate a data model corresponding to the common command.

The auto-configuration server 90 includes: a receiving unit 901, a common command generating unit 902, and a sending unit 903, where the receiving unit 901 is configured to receive information about commands supported by each device in N (N is a natural number that is greater than or equal to 2) devices in a network sent by a gateway; the common command generating unit 902 is configured to generate a common command according to the information about commands supported by each device in the N devices in the network; and the sending unit 903 is configured to send an instruction of generating a data model corresponding to the common command to the gateway, and send a batch management command for the data model corresponding to the common command to the gateway.

In the embodiment of the present invention, a gateway obtains information about commands supported by each device in a network, and sends the information about commands supported by each device to an auto-configuration server; the auto-configuration server generates a common command according to the information about commands supported by each device; and the gateway generates a data model corresponding to the common command according to an instruction of the auto-configuration server, receives a batch management command sent by the auto-configuration server for the data model corresponding to the common command, and manages the devices in the network in batches, thereby implementing batch management of the devices in the network covered by the gateway.

It should be noted that, the content, such as information exchange and execution process between units in the preceding apparatuses and system, is based on the same conception as this embodiment. Therefore, for details about the content, refer to the description in this embodiment.

All or a part of the steps of the method according to the embodiments may be implemented by a program instructing relevant hardware. The program may be stored in a computer readable storage medium. When the program is run, the steps of the method according to the embodiments are performed. The storage medium may be any medium capable of storing program codes, such as a read-only memory (ROM), a random-access memory (RAM), a magnetic disk or an optical disk.

The foregoing descriptions are merely preferred specific embodiments of the present invention, but are not intended to limit the protection scope of the present invention. Any variation or replacement figured out by a person skilled in the art within the technical scope disclosed in the present invention shall fall within the protection scope of the present invention. Therefore, the protection scope of the present invention shall be subject to the protection scope of the claims.

What is claimed is:

1. A method for managing devices in batches, comprising:
creating a batch management group according to a batch management group creation rule and device information in a network;
generating parameter information for the batch management group, wherein the parameter information comprises a plurality of supported commands supported by a plurality of devices of the batch management group and a command invoke rule, and wherein the command invoke rule specifies which of the devices are to receive certain batch management commands;
receiving a batch management command sent by an auto-configuration server for the devices in the batch management group;
determining a device that needs to be managed in the batch management group according to the batch management command, the supported commands, and the command invoke rule;
converting the batch management command into a command supported by the device that needs to be managed; and
sending the command supported by the device that needs to be managed to the device that needs to be managed.

2. The method according to claim 1, wherein creating the batch management group according to the batch management group creation rule and the device information in the network further comprises:
receiving the batch management group creation rule delivered by the auto-configuration server;
receiving an online message sent by the device in the network, wherein the online message comprises device information;
creating a second batch management group when the device does not belong to the batch management group;
adding the device into the second batch management group when the device does not belong to the batch management group, wherein the second batch management group is a newly created batch management group; and
adding the device into the batch management group when the device belongs to the batch management group.

3. The method according to claim 1, wherein creating the batch management group according to the batch management group creation rule and the device information in the network further comprises:
- receiving the batch management group creation rule delivered by the auto-configuration server;
- receiving an online message sent by the device in the network, wherein the online message comprises device information; and
- adding the device into the batch management group according to the creation rule and the device information.

4. The method according to claim 1, wherein the parameter information further comprises at least one of member information of the batch management group and identification information of the batch management group.

5. The method according to claim 1, wherein the batch management group creation rule comprises at least one of a protocol, a protocol version number, a device vendor, and a device type.

6. The method according to claim 1, wherein after converting the batch management command into the command supported by the device that needs to be managed and sending the command supported by the device that needs to be managed to the device that needs to be managed, the method further comprises:
- receiving a command execution response sent by the device that needs to be managed;
- generating, according to the command execution response, an execution result of the batch management command to be sent to the auto-configuration server; and
- sending the execution result to the auto-configuration server.

7. A gateway, comprising:
processor configured to:
- create a batch management group according to a batch management group creation rule and device information in a network, wherein the batch management group creation rule is made and sent to a gateway by an auto-configuration server; and
- generate parameter information for the batch management group, wherein the parameter information comprises a plurality of supported commands supported by a plurality of devices of the batch management group and a command invoke rule, and wherein the command invoke rule specifies which of the devices are to receive certain batch management commands;

a receiver coupled to the processor and configured to:
- receive the batch management group creation rule sent by the auto-configuration server;
- receive a batch management command sent by the auto-configuration server for the batch management group; and
- receive device information sent by a managed device, wherein the processor is further configured to:
- determine a device that needs to be managed in the batch management group according to the batch management command, the supported commands, and the command invoke rule; and
- convert the batch management command into a command supported by the device that needs to be managed; and a transmitter coupled to the processor and configured to send the command supported by the device that needs to be managed to the device that needs to be managed.

8. An auto-configuration server, comprising:
a processor configured to:
- generate a batch management group creation rule, wherein the batch management group creation rule is used to instruct a gateway to create a batch management group for a plurality of devices in a network and generate parameter information for the batch management group, wherein the parameter information comprises a plurality of supported commands supported by a plurality of devices of the batch management group and a command invoke rule, and wherein the command invoke rule specifies which of the devices are to receive certain batch management commands; and
- generate a batch management command for the batch management group according to a demand of managing the devices of the batch management group in the network in batches; and a transmitter coupled to the processor and configured to:
- send the batch management group creation rule to the gateway; and
- send the batch management command for the batch management group to the gateway.

9. A method for managing devices in batches, comprising:
- obtaining information about commands supported by each device in N devices, wherein N is a natural number that is greater than or equal to two;
- generating a common command according to the information about commands supported by each device;
- generating a data model corresponding to the common command, wherein the N devices support at least two types of communications protocols, wherein the data model comprises a common command invoke rule, and wherein the common command invoke rule specifies which of the N devices are to receive the common command;
- receiving a batch management command sent by the auto-configuration server for the data model corresponding to the common command;
- converting the batch management command into commands supported by one or more devices in the N devices according to the common command invoke rule; and
- sending the commands supported by the one or more devices to the one or more devices in the N devices.

10. The method according to claim 9, wherein the commands supported by the one or more devices are formed by a plurality of operations, and wherein converting the batch management command into the commands supported by the one or more devices in the N devices and sending the commands supported by the one or more devices to the one or more devices in the N devices further comprises:
- converting the batch management command into the operations corresponding to the commands supported by the one or more devices in the N devices; and
- sending the operations corresponding to the commands supported by the one or more devices to the one or more devices in the N devices.

11. The method according to claim 9, wherein sending the commands supported by the one or more devices to the one or more devices in the N devices according to the batch management command further comprises:
- determining a device that needs to be managed in the N devices according to a filter condition in the batch management command; and
- sending a command supported by the device that needs to be managed to the device that needs to be managed.

12. The method according to claim 9, wherein after sending the commands supported by the one or more devices to the one or more devices in the N devices according to the batch management command, the method further comprises:
receiving a command execution response sent by the one or more devices;
generating, according to the command execution response sent by the one or more devices, an execution result of the batch management command to be sent to the auto-configuration server; and
sending the execution result to the auto-configuration server.

13. The method according to claim 9, wherein generating the common command according to the information about commands supported by each device further comprises generating, when a command or a combination of a plurality of commands supported by each device is capable of implementing a certain general function, the common command that is capable of supporting the general function, wherein the common command is corresponding to the command or the combination of a plurality of commands supported by each device.

14. A gateway, comprising:
a receiver configured to:
receive information about commands supported by each device in N devices in a network; and
receive a batch management command sent by an auto-configuration server, wherein N is a natural number that is greater than or equal to two,
a processor coupled to the receiver and configured to:
generate a common command according to the information about commands supported by each device in the N devices,
wherein the data model generating unit is configured to generate a data model corresponding to the common command, wherein the data model comprises a common command invoke rule, and wherein the common command invoke rule specifies which of the N devices are to receive the common command, and
a transmitter coupled to the processor and configured to send commands supported by one or more devices to the one or more devices in the N devices according to the common command invoke rule.

15. An auto-configuration server, comprising:
a processor configured to generate a batch management command for a data model corresponding to a common command, and
a transmitter coupled to the processor and configured to send the batch management command for the data model corresponding to the common command to a gateway, wherein the data model comprises a common command invoke rule, wherein the common command invoke rule specifies which of N devices are to receive the common command, and wherein N is a natural number that is greater than or equal to two.

16. A method for managing devices in batches, comprising:
obtaining information about commands supported by each device in N devices, and sending the information to an auto-configuration server, wherein N is a natural number that is greater than or equal to two, and wherein the N devices support at least two types of communications protocols;
generating a data model corresponding to a common command according to an instruction of the auto-configuration server, wherein the common command is generated by the auto-configuration server according to the information about commands supported by each device in the N devices, wherein the data model comprises a common command invoke rule, and wherein the common command invoke rule specifies which of the N devices are to receive the common command;
receiving a batch management command sent by the auto-configuration server for the data model corresponding to the common command;
converting the batch management command into commands supported by one or more devices in the N devices according to the common command invoke rule; and
sending the commands supported by the one or more devices to the one or more devices in the N devices.

17. The method according to claim 16, wherein the commands supported by the one or more devices are formed by a plurality of operations, and wherein converting the batch management command into commands supported by the one or more devices in the N devices, and sending the commands supported by the one or more devices to the one or more devices in the N devices further comprises:
converting the batch management command into the operations corresponding to the commands supported by the one or more devices in the N devices; and
sending the operations corresponding to the commands supported by the one or more devices to the one or more devices in the N devices.

18. The method according to claim 16, wherein sending the commands supported by the one or more devices to the one or more devices in the N devices according to the batch management command further comprises:
determining a device that needs to be managed in the N devices according to a filter condition in the batch management command; and
sending a command supported by the device that needs to be managed to the device that needs to be managed.

19. The method according to claim 16, wherein after sending the commands supported by the one or more devices to the one or more devices in the N devices according to the batch management command, the method further comprises:
receiving a command execution response sent by the one or more devices; and
generating, according to the command execution response sent by the one or more devices, an execution result of the batch management command to be sent to the auto-configuration server; and
sending the execution result to the auto-configuration server.

20. The method according to claim 16, wherein the common command being generated by the auto-configuration server according to the information about commands supported by each device in the N devices further comprises when a command or a combination of a plurality of commands supported by each device is capable of implementing a certain general function, the common command that is capable of supporting the general function is generated, wherein the common command is corresponding to the command or the combination of a plurality of commands supported by each device.

21. A gateway, comprising:
a processor;
a receiver coupled to the processor and configured to:
receive information about commands supported by each device in N devices in a network, wherein N is a natural number that is greater than or equal to two;

receive an instruction of generating a data model corresponding to a common command, wherein the instruction is sent by an auto-configuration server; and receive a batch management command sent by the auto-configuration server; and a transmitter coupled to the processor and configured to:
send the information about commands supported by each device in the N devices in the network to the auto-configuration server; and send commands supported by one or more devices to the one or more devices in the N devices, and wherein the processor is configured to generate the data model corresponding to the common command according to the instruction of generating the data model corresponding to the common command that is received from the auto-configuration server, wherein the data model comprises a common command invoke rule, and wherein the common command invoke rule specifies which of the N devices are to receive the common command.

22. An auto-configuration server, comprising:
a receiver configured to receive information about commands supported by each device in N devices in a network sent by a gateway, wherein N is a natural number that is greater than or equal to two, a processor coupled to the receiver and configured to generate a common command according to the information about commands supported by each device in the N devices in the network; and a transmitter coupled to the processor and configured to:
send an instruction of generating a data model corresponding to the common command to the gateway; and send a batch management command for the data model corresponding to the common command to the gateway, wherein the data model comprises a common command invoke rule, and wherein the common command invoke rule specifies which of the N devices are to receive the common command.

* * * * *